United States Patent [19]
Messer, III

[11] Patent Number: 6,109,426
[45] Date of Patent: *Aug. 29, 2000

[54] ORIENTED BOTTLE CONVEYOR

[75] Inventor: Carroll B. Messer, III, Lynchburg, Va.

[73] Assignee: Simplimatic Engineering Company, Lynchburg, Va.

[*] Notice: This patent issued on a continued prosecution application filed under 37 CFR 1.53(d), and is subject to the twenty year patent term provisions of 35 U.S.C. 154(a)(2).

[21] Appl. No.: 08/747,849

[22] Filed: Nov. 13, 1996

[51] Int. Cl.$^7$ ................................................ B65G 15/10
[52] U.S. Cl. ...................... 198/817; 198/604; 198/626.6
[58] Field of Search .................... 198/817, 626.5, 198/626.6, 604, 389, 841, 837; 406/88, 86

[56] References Cited

U.S. PATENT DOCUMENTS

| | | | |
|---|---|---|---|
| 1,902,873 | 3/1933 | Marone | 198/837 |
| 2,631,717 | 3/1953 | Cox | 198/841 |
| 2,777,562 | 1/1957 | McCahon et al. . | |
| 2,862,606 | 12/1958 | Schlichting . | |
| 3,140,971 | 7/1964 | Crescenzo et al. | 198/837 |
| 3,170,564 | 2/1965 | Gatto | 198/626.5 |
| 3,202,187 | 8/1965 | Pechmann | 198/604 |
| 3,802,549 | 4/1974 | Kinsey | 198/626.6 |
| 3,848,732 | 11/1974 | Catalano | 198/841 |
| 3,850,284 | 11/1974 | Roberts . | |
| 3,850,478 | 11/1974 | Hurd | 406/86 |
| 4,095,390 | 6/1978 | Knudsen . | |
| 4,142,643 | 3/1979 | Hamrick . | |
| 4,284,370 | 8/1981 | Danler et al. | 406/86 |
| 4,479,574 | 10/1984 | Julius et al. . | |
| 4,685,553 | 8/1987 | Jennings . | |
| 4,802,571 | 2/1989 | Born et al. . | |
| 4,938,636 | 7/1990 | Aidlin et al. | 406/86 |
| 5,161,919 | 11/1992 | Smith et al. | 406/86 |
| 5,388,707 | 2/1995 | Stivison et al. | 198/389 |
| 5,501,552 | 3/1996 | Simkowski | 406/52 |

FOREIGN PATENT DOCUMENTS

| | | | |
|---|---|---|---|
| 0 466 278 A1 | 3/1992 | European Pat. Off. . | |
| 1359812 | 3/1964 | France | 198/817 |

*Primary Examiner*—Christopher P. Ellis
*Assistant Examiner*—Joe Dillon, Sr.
*Attorney, Agent, or Firm*—St. Onge Steward Johnston & Reens LLC

[57] ABSTRACT

A bottle conveyor to maintain positive control over the orientation of bottles includes guides above and below a collar around the neck of the bottles on either side of the neck. The guides may be endless belts and/or fixed guides. Endless belts may also advance the bottles and may be driven at the same or different speeds to prevent or induce rotation in the bottles as desired. The distance between guides may be adjusted to adapt the conveying system to bottles having various collar thicknesses and neck diameters and to regulate the amount of allowable swing.

7 Claims, 7 Drawing Sheets

ORIENTED BOTTLE CONVEYOR

FIELD OF THE INVENTION

The invention relates to a conveyor system and, in particular, to a conveyor system for positively orienting bottles to transfer them between system components.

BACKGROUND OF THE INVENTION

Bottles, especially plastic bottles, are often transported by neck guides to and from various points on conveyor lines. This is an effective way in which to transport bottles; however, during transport, the bottles may swing from the neck guides and attempt to enter conveyor system components such as filling or rinsing stations and the like, in non-aligned positions. If the bottles are not properly aligned upon entering such a station, they may not be properly cleaned or filled, may be damaged and/or may themselves jam or damage conveying equipment. This problem is exacerbated at high conveying speeds and by conveyor stations which require bottles to be metered or spaced apart in a single file prior to entering the station since space between successive bottles permits them to swing more easily.

One example of such a bottle conveying system is disclosed by U.S. Pat. No. 4,142,643 to Hamrick. The Hamrick device employs two parallel conveying V-belts which contact and support the bottle by the narrow neck region below the threads. Bottles transferred by the Hamrick device remain free to swing side to side and front to back along the conveying line about the support point. This freedom of motion is undesirable because it can cause the above mentioned problems.

Another example is U.S. Pat. no. 4,802,571 to Born which discloses two parallel conveying belts which contact and support each bottle by the underside of a collar around the neck of the bottle. The Born device includes rail bars (60) which limit side to side bottle movement, however, bottles are still free to move front to back.

What is desired, therefore, is a bottle conveyor system which supports and transports bottles by the neck region and which limits side to side and front to back movement of the bottles to retain them in a position aligned for proper transfer to conveying stations for rinsing, filling or the like.

SUMMARY OF THE INVENTION

Accordingly, it is an object of the invention to provide a conveying system for bottles which maintains the bottles in an aligned position for transfer to a downstream station.

Another object of the invention is to provide a conveying system of the above character in which guides contact the upper surfaces of collars on the bottles thereby increasing the control maintained over orientation of the bottles.

Yet another object of the invention is to provide a conveying system of the above character in which the guides are endless belts which contact the upper surfaces of the collars on the bottles thereby increasing the control maintained over orientation of the bottles.

A further object of the present invention is to provide a conveying system of the above character wherein the spacing between the belts may be adjusted in order to accommodate bottles having collars of various thicknesses and diameters.

Still a further another object of the invention is to provide a conveying system of the above character wherein the conveying system overlaps the infeed mechanism of the downstream station such that the bottles are maintained in the aligned position during transfer to the downstream station.

Yet a further object of the invention is to provide a conveying system of the above character wherein the belts may be driven at equal or different speeds to prevent or induce rotation in the bottles as desired.

These and other objects are achieved by the conveyor system of the invention which includes guides which contact the upper surfaces of a collar on either side of the neck of the bottle to maintain positive control over the orientation of the bottle during transport. The guides, which may be belts, grip one side of the collar around the neck of a bottle and are substantially parallel to one another. The guides belts may be driven at the same or different speeds to prevent or induce rotation in the bottle as desired. Also, the distance between guides may be adjusted to adapt the conveying system to bottles having various neck diameters, and collars with various thicknesses.

The invention and its particular features and advantages will become more apparent from the following detailed description considered with reference to the accompanying drawings.

DETAILED DESCRIPTION OF THE INVENTION

Figure 1:
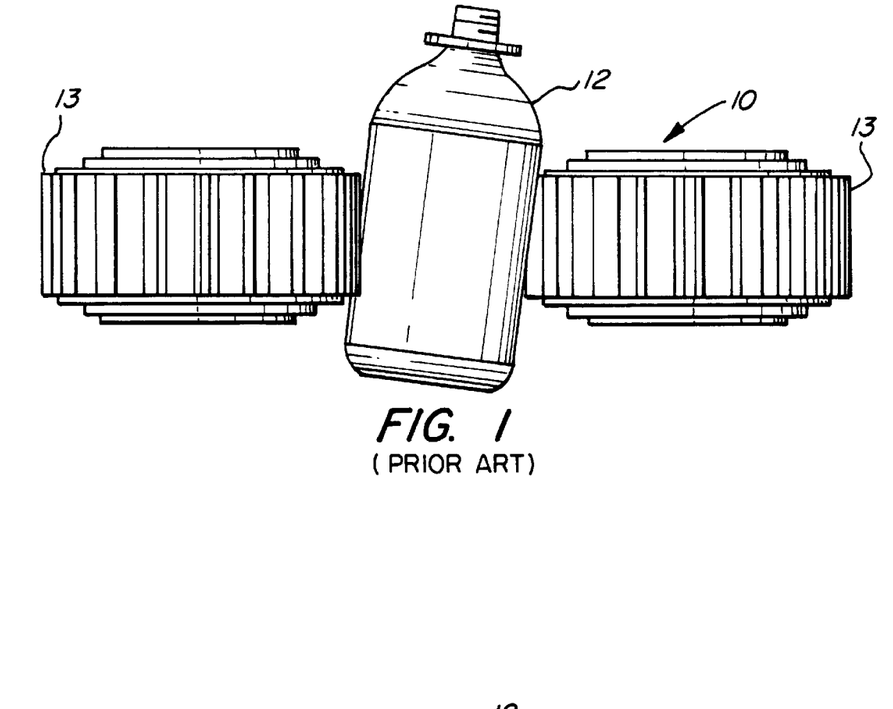
FIG. 1 is an end view of a prior art conveying system showing the possible misalignment of bottles driven by belts which contact the sides of the bottle.

Referring to FIG. 1, a prior art device 10 for transporting bottles 12 includes belts 13 which grip the sides of the bottle. As depicted however, this device does not effectively prevent the bottle 12 from becoming disoriented. Bottles may become misaligned and may fall over, jamming the conveyor. Also, this prior art device 10 necessarily requires contact with the side portions of the bottle. Such contact may be desired to be avoided during operations such as drying and labeling.

Figure 2:
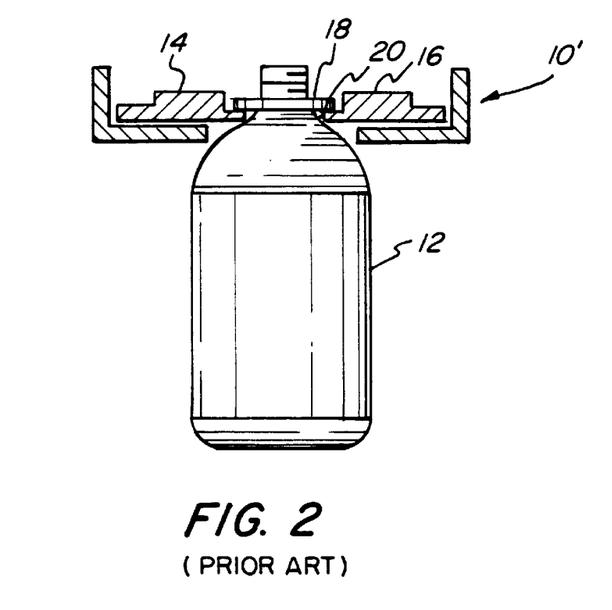
FIG. 2 is an end view of a prior art conveying system showing the potential for uncontrolled lateral and longitudinal swinging.

Referring to FIG. 2, another prior art device 10' for transporting bottles 12 includes belts 14, 16 which support bottle 12 by the underside of a collar 18 about the neck portion 20 thereof. As above, however, this device does not effectively prevent the bottle 12 from becoming disoriented. Bottle 12 is free to swing in both the lateral and longitudinal directions. Uncontrolled swinging, especially at high conveyor speeds is undesirable because of the possibility of damage to the bottles.

Figure 3:
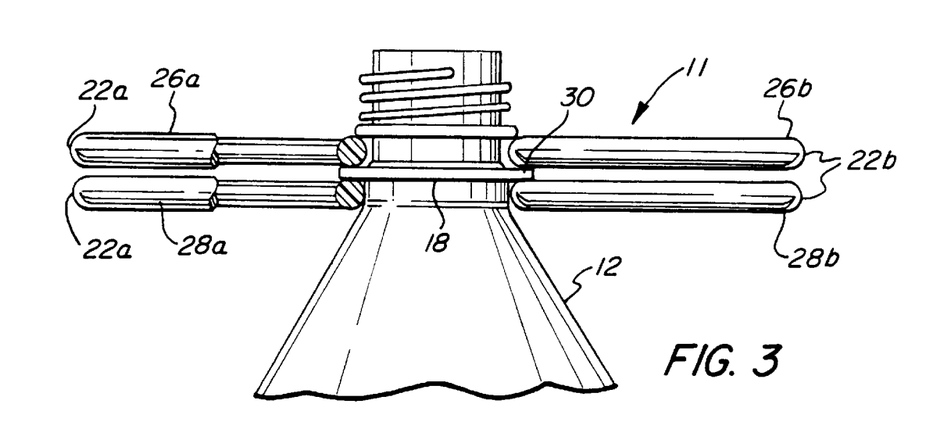
FIG. 3 is an enlarged, partial end view of the conveying system of the invention showing belts maintaining positive control over the orientation of a bottle by contacting the upper and lower surfaces of a collar around the neck of the bottle.

Referring to FIG. 3, conveying system 11 of the present invention includes guides 22 which maintain positive control over bottles 12 during transport. Guides 22a, 22b maintain positive control over bottle 12 by contacting both the upper and lower surfaces of collar 18. Guides 22a, 22b may comprise upper belts 26a, 26b and lower belts 28a, 28b which serve the dual purpose of transporting and stabilizing bottle 12. Because the movement of collar 18 is limited by the upper and lower belts, the amount by which bottle 12 may swing from vertical is also limited. The distance between the upper belts 26a, 26b and the lower belts 28a, 28b may be adjusted for purposes of compensating for both various collar thicknesses and various neck widths, and also for regulating the amount or degree of allowable swing of bottle 12. The height of gap 30 between collar 18 and the upper belts 26a, 26b will determine the maximum angle through which bottle 12 may swing in any direction. The height of gap 30 is necessarily the difference between the distance between the upper and lower belts and the thickness of collar 18.

Figure 4:
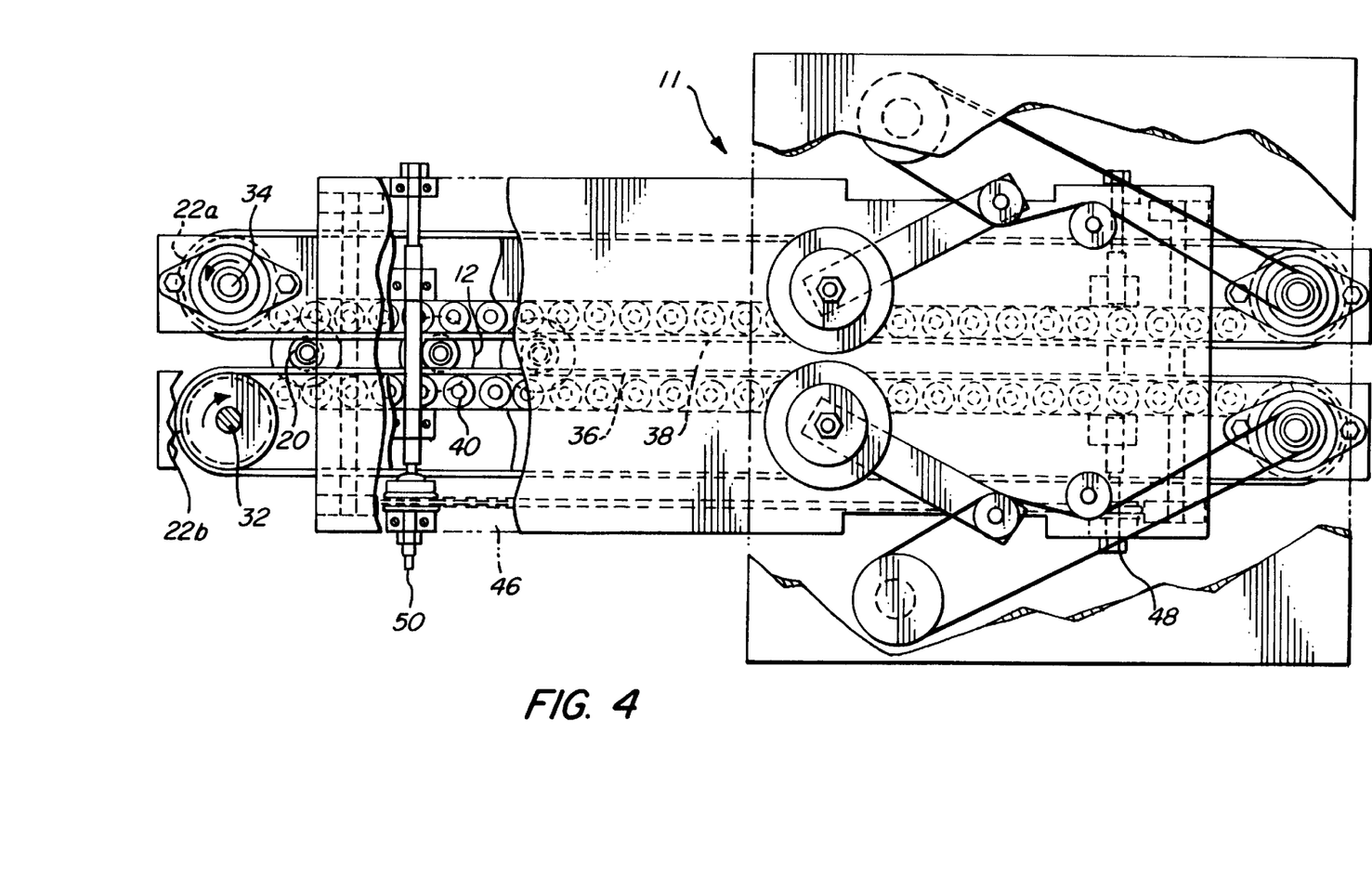
FIG. 4 is a top view of the conveying system of FIG. 3 showing an array of support rollers and support structure for adapting the conveying system to bottles of various dimensions.

Referring to FIG. 4, guides 22a, 22b are preferably sufficiently supported along their lengths to prevent bottles 12 from becoming unstable or dropping out during transport. Guides 22a, 22b preferably comprise belts, and each guide 22a or 22b is preferably driven by a motor 32 or 34. Inside band portions 36, 38 of the guides 22a, 22b are supported by a plurality of passive support rollers 40. Preferably, the support rollers 40 are closely-spaced and have a diameter of between 90% and 100% of the diameter of the neck 20 of bottle 12. Guides 22a, 22b may be driven at equivalent speeds to prevent the rotation of the bottles 12 during transport, or if desired, rotation may be induced in the bottles 12 by driving the belts at dissimilar speeds.

Figures 5, 6:
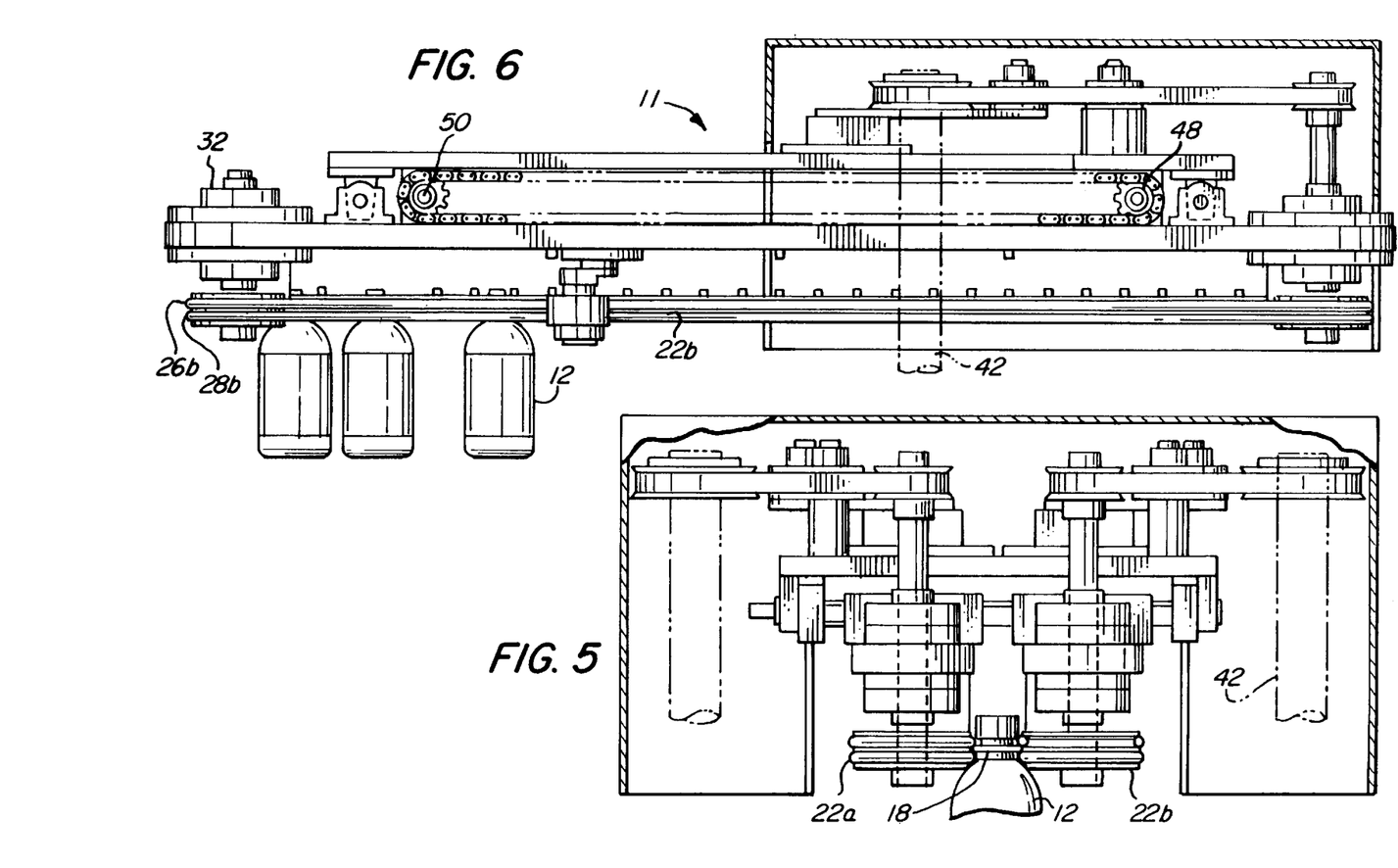
FIG. 5 is an end view of the conveying system of FIG. 4 showing support structure for adapting the conveying system to bottles of various dimensions.
FIG. 6 is a side view of the conveying system of FIG. 4.

Referring to FIGS. 4, 5 and 6, guides 22a, 22b are preferably supported by support structures 42 which may be adjusted to provide for bottles having collars 18 of various thicknesses and diameters. In one embodiment, the support structures 42 may be slidably attached to a base 46 at a first point 48, and may be attached to the base 46 by a threaded rod 50 at another point. In this manner, the horizontal distance between guides 22a, 22b may be adjusted by rotating the threaded rod 50, thereby allowing the conveying system to adapt to various bottle configurations. Also, as mentioned above with respect to FIG. 3, the distance between the upper belts 26a, 26b and the lower belts 28a, 28b may be adjusted to compensate for various collar thicknesses and to regulate the amount or degree of allowable swing of bottle 12.

Figure 7:
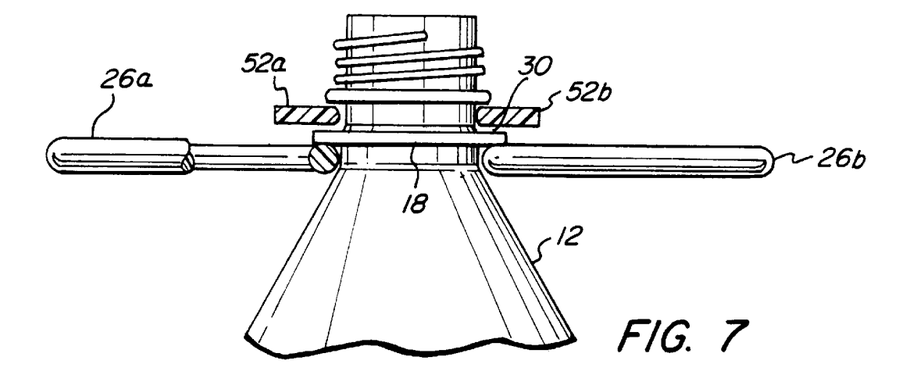
FIG. 7 is an end view of another embodiment of the conveying system of FIG. 3 having belts and fixed guides maintaining positive control over the orientation of a bottle by contacting the upper and lower surfaces of a collar around the neck of the bottle.

Referring to FIG. 7, guides may comprise a combination of belts 26a, 26b and fixed guides 52a, 52b. Belts 26a, 26b may be driven to transport bottles 12, and guides 52a, 52b may remain stationary. Preferably, the belts 26a, 26b are located beneath the bottle collars 18 and a gap 30 exists between collar 18 and fixed guides 52a, 52b to minimize friction therebetween while providing stability against bottle 12 swing.

Figure 8:
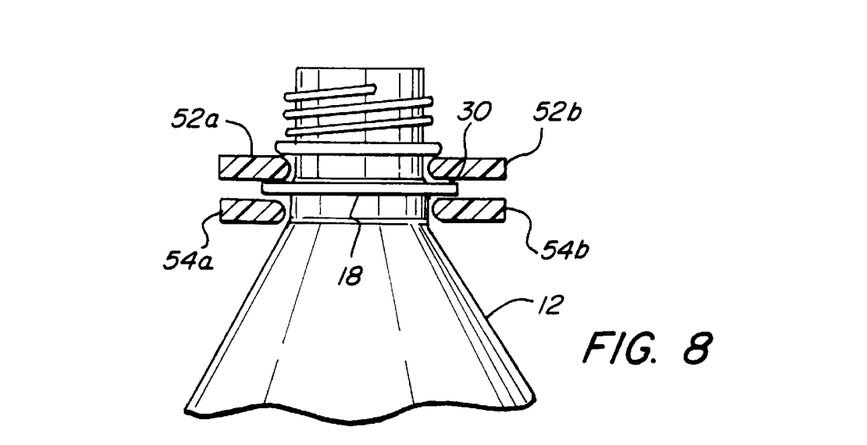
FIG. 8 is an end view of another embodiment of the conveying system of FIG. 3 having fixed guides maintaining positive control over the orientation of a bottle by contacting the upper and lower surfaces of a collar around the neck of the bottle.

Referring to FIG. 8, guides 22 may also comprise only fixed guides 52a, 52b, 54a, 54b. In this embodiment, another means to transport the bottles along the conveyor, such as an air conveyor mechanism, would be required. As above, a gap 30 preferably exists between collar 18 and fixed guides 52a, 52b to minimize friction therebetween while providing stability.

Figure 9:
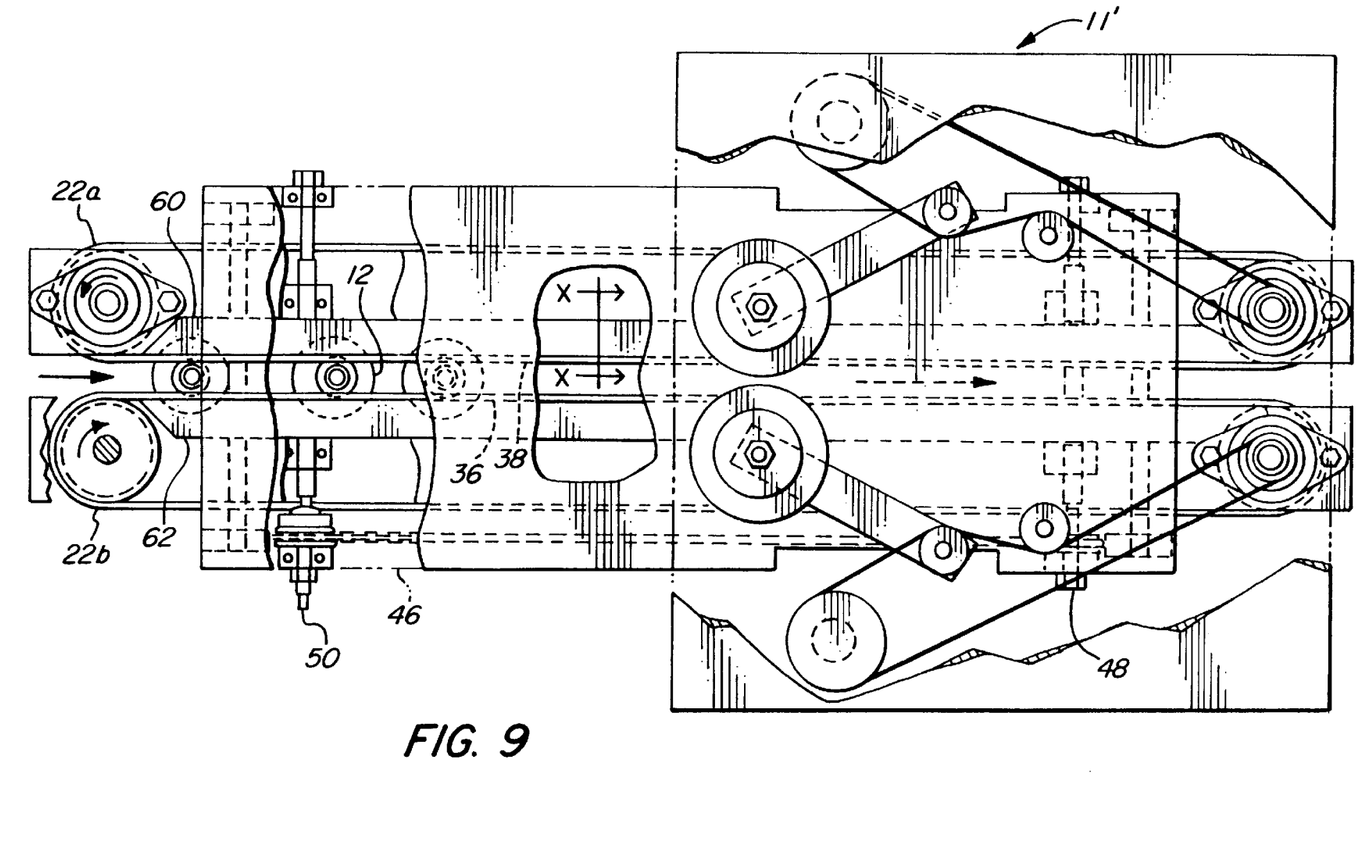
FIG. 9 is a top view of another embodiment of a conveying system of the present invention which employs guide beams to support the inside band portions of the guides.
Figures 10, 11:
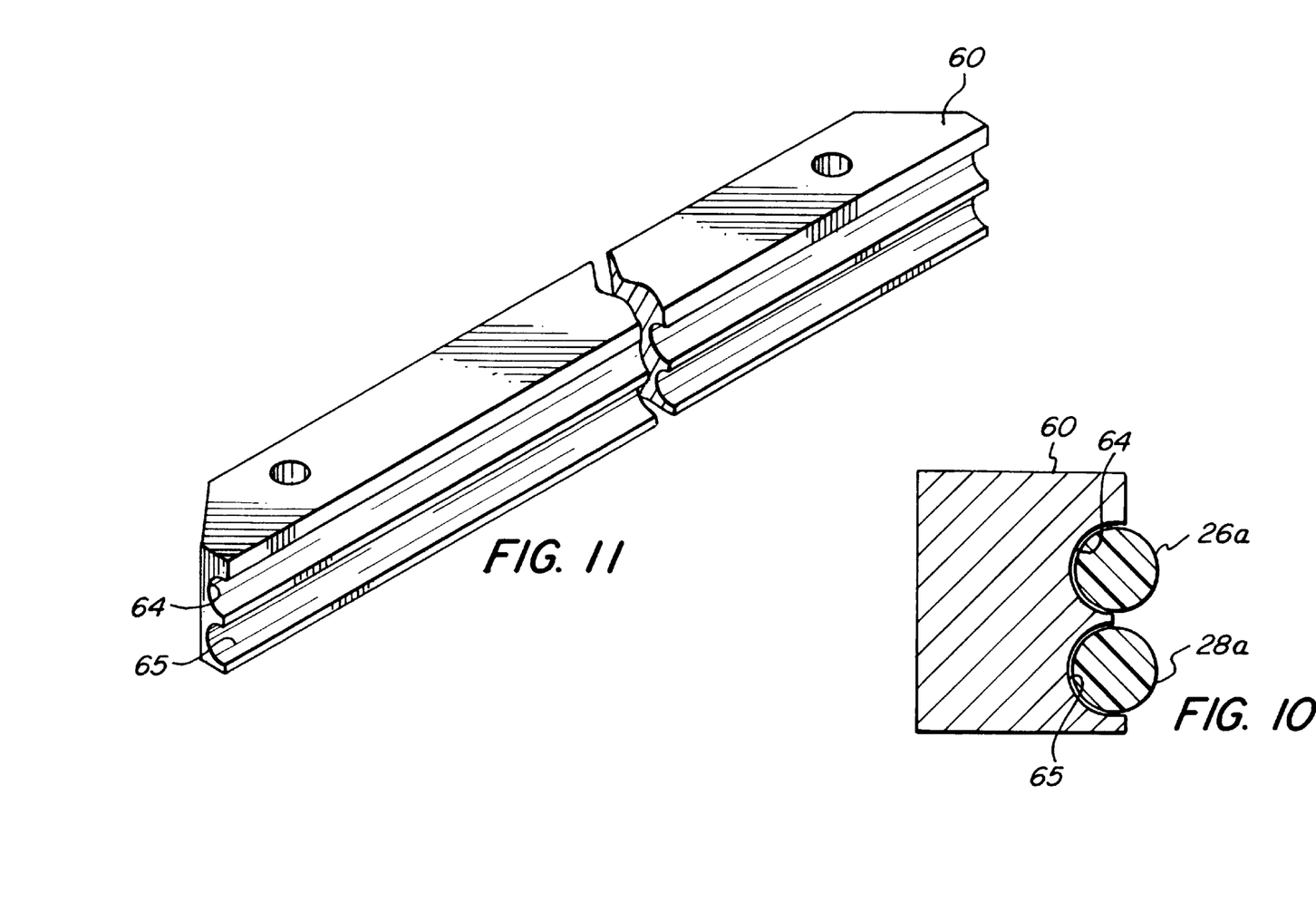
FIG. 10 is a cross-sectional view taken along line X—X of FIG. 9.
FIG. 11 is a perspective view of a guide beam of FIG. 9 showing guide grooves for receiving belts.

In FIGS. 9, 10 and 11, the support rollers 40 are replaced by guide beams 60, 62 attached to the base 46 which have guide grooves extending substantially along the length of the inside band portions 36, 38 of the guides 22a, 22b. FIG. 9 corresponds to FIG. 4, with this embodiment of a conveying system marked by reference numeral 11'. FIG. 10 is a cross section taken along line X—X of FIG. 9. The guide beam 60 has two guide grooves 64, 65 to receive belts 26a, 28a. The use of guide beams 60, 62 having guide grooves to support the inside band portions 36, 38 of the guides 22a, 22b may be preferable in many cases to the use of the support rollers 40 because of the ease of assembly afforded by the guide beams 60, 62.

Note that it may also be desired to provide lower belts 28a, 28b which have a larger diameter than the upper belts 26a, 26b because it has been found during testing that due to the configuration of a bottle's 12 neck portion 20 and the collar 18, there is more stability and less swing during transport if the lower belts 28a, 28b are larger in diameter than the upper belts 26a, 26b. If such lower belts are employed, then the guide grooves corresponding to the lower belts need also be larger sized than the guide grooves corresponding to the upper belts to properly accommodate the lower belts.

Figure 12:
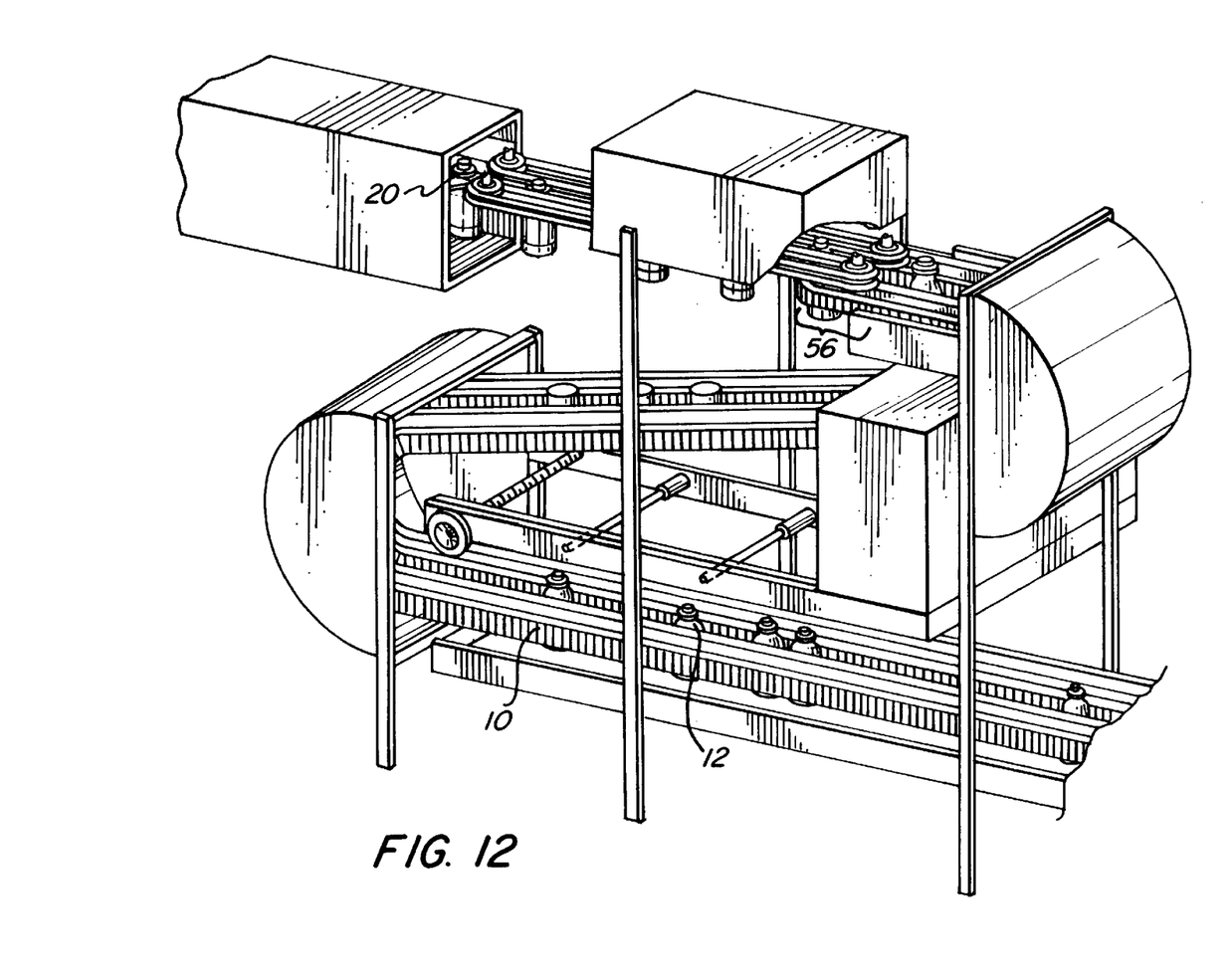
FIG. 12 is a front isometric view the conveying system of FIG. 3 in place between a portion of a bottle conveyor and a downstream station preferring aligned bottle input.

Referring to FIG. 12, to transfer bottles 12 between a downstream conveyor 15 which transports bottles 12 by the sides thereof and the present conveyor which handles bottles 12 by the neck portion 20, the two conveying subsystems overlap each other at a distance 56 to provide continuous positive control over the bottles 12 for maintaining their orientation during transfer. The downstream conveyor 15 has an infeed mechanism 17 which acquires positive control over the bottles during transfer.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A conveying system for articles having neck collars, the neck collars having upper surfaces and lower surfaces, said system comprising:

a first pair of belts contacting said lower surfaces of said neck collars for supporting the articles;

a second pair of belts contacting said upper surfaces of said neck collars for positively aligning the articles;

wherein said first and second pairs of belts frictionally engage the lower surfaces and upper surfaces of the neck collars respectively to cause the articles to move with the first and second pairs of belts; and a motor for advancing said first and second pairs of belts to convey the articles.

2. A conveying system as in claim 1 further comprising a means to adjust the relative speeds of said belts to control the rotation of the article during transport.

3. A conveying system as in claim 1 further comprising a plurality of support rollers, said rollers supporting at least one pair of said belts.

4. A conveying system as in claim 1 further comprising guide beams having grooves to support at least one pair of said belts.

5. A conveying system as in claim 1 further comprising a downstream station having an infeed mechanism and wherein said belts remain in contact with said collars until said infeed mechanism of said downstream station acquires positive control over the articles such that positive control is maintained over the articles during transfer.

6. A conveying system for articles having neck collars with upper and lower surfaces comprising:

a first pair of belts contacting said lower surfaces of said neck collars for supporting the articles;

a second pair of belts contacting said upper surfaces of said neck collars for positively aligning the articles;

a plurality of guide beams having grooves to support at least one of said first pair or said second pair of belts;

wherein said first and second pairs of belts frictionally engage the lower surfaces and upper surfaces of the neck collars respectively to cause the articles to move with the first and second pairs of belts; and a motor for advancing said first and second pair of belts to convey the articles.

7. A conveying system for articles having neck collars with upper and lower surfaces comprising:

a first pair of belts contacting said lower surfaces of said neck collars for supporting the articles;

a second pair of belts contacting said upper surfaces of said neck collars for positively aligning the articles; and a motor for advancing said first and second pair of belts to convey the articles, wherein said first pair of belts is larger in diameter than said second pair of belts.

* * * * *